US 12,531,810 B2

(12) United States Patent
Murthy et al.

(10) Patent No.: US 12,531,810 B2
(45) Date of Patent: Jan. 20, 2026

(54) EDGE TO CLOUD QUALITY OF EXPERIENCE OPTIMIZER

(71) Applicant: HEWLETT PACKARD ENTERPRISE DEVELOPMENT LP, Spring, TX (US)

(72) Inventors: Karthik Srinivasa Murthy, Santa Clara, CA (US); Sachin Ganu, Santa Clara, CA (US); Rajarshi Bhattacharyya, Santa Clara, CA (US); Parag Dedhia, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 15 days.

(21) Appl. No.: 18/646,547

(22) Filed: Apr. 25, 2024

(65) Prior Publication Data

US 2025/0337690 A1    Oct. 30, 2025

(51) Int. Cl.
*H04L 47/2425*  (2022.01)
*H04L 43/091*  (2022.01)
*H04L 47/62*  (2022.01)

(52) U.S. Cl.
CPC ........ *H04L 47/2433* (2013.01); *H04L 43/091* (2022.05); *H04L 47/6215* (2013.01)

(58) Field of Classification Search
CPC ............ H04L 47/2433; H04L 47/6215; H04L 43/091
See application file for complete search history.

(56) References Cited

U.S. PATENT DOCUMENTS

| 1,016,712 | A  | * | 2/1912  | Schilling  | A47C 3/0255 472/125 |
| 10,164,891 | B2 | * | 12/2018 | Stanwood  | H04L 47/2441 |
| 11,051,320 | B1 | * | 6/2021  | Siraj  | H04L 47/803 |
| 11,632,773 | B2 | * | 4/2023  | Siraj  | H04L 47/6215 370/235 |
| 2014/0334309 | A1 | * | 11/2014 | Mihaly  | H04L 47/2441 370/235 |
| 2021/0298042 | A1 | * | 9/2021  | Siraj  | H04L 47/24 |

OTHER PUBLICATIONS

Piamrat at .al., "QoE Aware Scheduling for Video Streaming in High SPped Dowlink Packet Access", IEEE Wireless Communicatoin and Networking Conference, Apr. 18, 2010, IEEE Publishing.*
Bura et al., "QFlow: A Learning Approach to High QoE Video Streaming at the Wireless Edge", IEEE/ACM Transactions on Netwoorking, vol. 30, Issue: 1, Feb. 2022.*

* cited by examiner

*Primary Examiner* — Todd L Barker
(74) *Attorney, Agent, or Firm* — Sheppard Mullin Richter & Hampton LLP

(57) ABSTRACT

Systems and methods are provided for traffic flow scheduling optimization through prioritizing traffic flows according to a Quality of Experience (QoE) score. Examples receive data packets of a plurality of traffic flows by an access point of a network, map the data packets of the plurality of traffic flows to a plurality of queues based on traffic identifiers of each data packet, and determine a QoE score for each traffic flow of the plurality of traffic flows. Examples can then prioritize the data packets based on the QoE scores determined for the plurality of traffic flows and schedule the data packets for transmission or reception based on the prioritization.

17 Claims, 9 Drawing Sheets

EDGE TO CLOUD QUALITY OF EXPERIENCE OPTIMIZER

BACKGROUND

Multiple, different transmission protocols can be used to effectuate Wi-Fi transmissions. Examples of such transmission protocols include, e.g., OFDMA (Orthogonal Frequency-Division Multiple Access), which may be used to support low latency operations, and MU-MIMO (Multi-User Multiple-Input and Multiple-Output), which may be used to support high data throughput operations.

The IEEE 802.11ax standard, also referred to as Wi-Fi 6, provides support for both OFDMA and MU-MIMO modes of operation in the uplink and downlink directions. These alternative modes allow for flexibility in supporting varying operations as applications requiring low latency and operations requiring high data throughput will be supported by a particular access point (AP) that is operating under IEEE 802.11ax.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
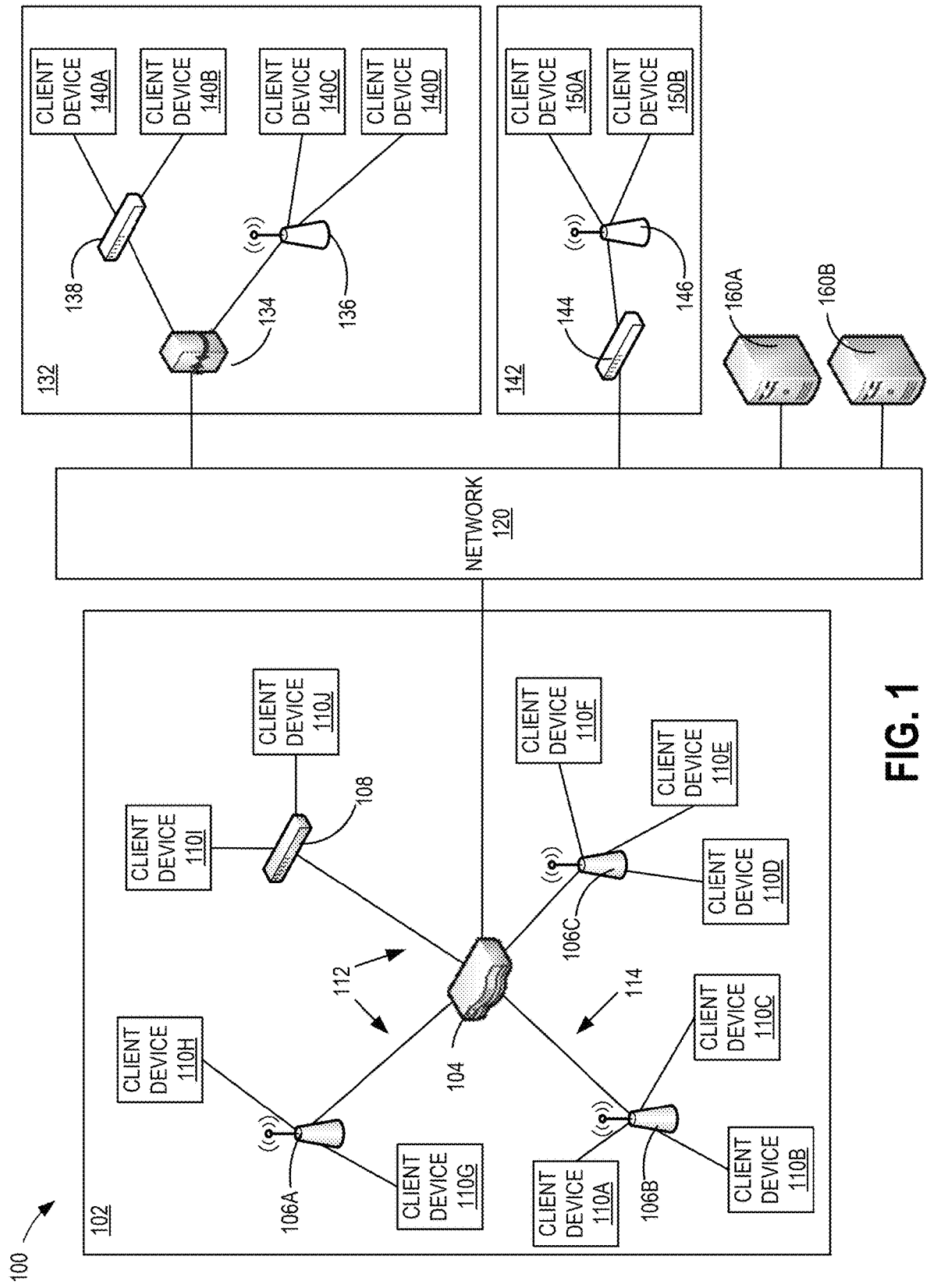
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Examples of the presently disclosed technology provide for flow scheduling optimization through prioritizing low latency traffic flows on the DL, and optimized triggering for UL. Examples can dynamically manage priority and scheduling of traffic flows to meet latency and throughput requirements, and ensure that the traffic flows do not compete for airtime, which can degrade throughput, or compete with other non-prioritized application flows leading to starvation. Examples according to the present disclosure provide for such optimization by dynamically prioritizing traffic flows according to a Quality of Experience (QoE) score.

QoE, which is distinct from Quality of Service (QOS), focuses on the experience at end user devices and parameters impacting the end-user experience. QoE is a measure of the delight or annoyance of an end-user's experience with a service (e.g., web browsing, phone call, TV broadcast). QoE focuses on the entire service experience. Whereas, QoS is a description or measurement of the overall performance of a service that focuses on network infrastructure and operating parameters affecting transmission/reception at the network infrastructure. Thus, QoE can be a measure from the end-user's perspective of the overall quality of the service provided, while QoS is generally focuses on the media or network itself and not the perspective of the end-user. Example of QoS parameters may include, but are not limited to, packet loss, bit rate, throughput, transmission delay, availability, jitter, etc. The examples herein provide a novel approach to measuring QoE, as will be described below in greater detail.

As alluded to above, the IEEE 802.11 ax standard provides support for both OFDMA and MU-MIMO modes of operation in uplink and downlink. However, these modes of operation should be applied effectively in order to receive full benefits of the technology. For example, in a system that is supporting multiple different applications for multiple clients, the latency and data requirements of each application may vary greatly. Further, there may be certain applications that should be prioritized in a particular environment.

The IEEE 802.11 family of standards for wireless local area network (WLAN) technology, also referred to as Wi-Fi, typically include Quality of Service (QOS) extensions that can manage prioritization based on the type of data. For example, QoS extensions for some 802.11 protocols may prioritize the transmission of voice packets and video packets. Particularly, Wi-Fi Multimedia (WMM), previously known as Wireless Multimedia Extensions (WME), is a subset of the 802.11e wireless LAN (WLAN) specification that enhances QoS on a network by prioritizing packets according to four access categories (AC). According to WMM, the access categories (arranged from highest priority to lowest) include:

1) Voice: By giving voice packets the highest priority, WMM enables concurrent Voice over IP (VOIP) calls with minimal latency and the highest quality possible;
2) Video: By placing video packets in the second tier, WMM prioritizes it over all other data traffic and enables support for three to four standard definition TV (SDTV) streams or one high definition TV (HDTV) stream on a WLAN;
3) Best effort: Best effort data packets consist of those originating from legacy devices or from applications or devices that lack QoS standards; and
4) Background: Background priority encompasses file downloads, print jobs and other traffic that does not suffer from increased latency.

Each of the aforementioned WMM access categories represents a different WLAN transmit and/or receive (Tx/Rx) policy. WMM also defines how Differentiated Services Code Point (DSCP) values can be mapped into those access categories. For example, when traffic flows, consisting of related data packets, comes from a wired network to a wireless client, the WMM maps DSCP values to certain access categories so that packets which contain different DSCP values, are routed to different transmission queues. For example, in the UL side, an application on a client device may set a DSCP value for its packets, based on the application's specifications. Prior to transmission of traffic flow from the application (referred to as an application flow), a flow scheduler may use the DSCP value to determine a Traffic ID (TID) that can be assigned to the traffic flow, which the flow scheduler use to map the data packet and other data packets constituting the traffic flow, to a queue corresponding to one of the ACs. Thus, the packets, being in the different transmission queues, can be transmitted in accordance with different WLAN transmission policies of the ACs.

However, WMM and other conventional transmission schemes for Wi-Fi 6 should be applied optimally in order to maximize the benefits for traffic to move efficiently in the wireless network. For example, Wi-Fi services need to be scheduled appropriately to meet any guaranteed service level agreements (SLAs) that specify critical applications. In most cases, different applications may require different treatment in terms of allocating wireless resources that are available from an access point. For instance, a voice application may have low jitter tolerance, (e.g., less than 20 ms), while a video streaming application may generally have higher bandwidth (e.g., high throughput) requirements. Even further, applications that are being developed for newer technology, such as virtual reality (VR) (e.g., used in gaming, training, and other operations) may require both high bandwidth and low latency guarantees in order to provide acceptable user experience.

In a typical WLAN, under mixed traffic flow scenarios with Overlapping Basic Service Set (OBSS) interference, latency sensitive application (LSA) traffic flows often experience jitter and delay, even when the channel is operating in light load conditions. When there are high throughput full buffer background traffic flows, LSA traffic flows can suffer from starvation or can cause competing traffic flows to starve on the UL and/or DL and depending on the WMM access category of the competing traffic flows. Conventional approaches are unable to dynamically sort or prioritize traffic flows in terms of both ACs and latency characteristics to improve performance in terms of throughput and Mean Opinion Score (MOS) scores (e.g., a measure of perceived quality) in both the DL and UL direction. This is because, in the DL direction, the conventional WLAN networks are unable to reliably identify traffic flows corresponding to critical application accurately and consistently, signal flow priority and latency parameters, and/or provision the critical traffic flows in the data path. In the UL direction, conventionally an AP may not have a way to know a queue depth (e.g., number of queued data packets) on a client device ahead of time, at least until the AP first spends a channel access to query the size of the queue depth using Buffer Status Report Poll (BSRP), which may or may not lead to successful UL transmission within a desired latency bound condition defined by an SLA. These inefficiencies can lead to a poor QoE for the end user.

While certain approaches have been proposed that attempt to prioritize critical applications, these approaches have been limited to DL using a combination of internal priority queuing/dequeuing and WMM boosting. However, these techniques have not been shown to apply to UL triggering. Real-time applications (such as, but not limited to, VoIP and video conferencing applications) are typically bidirectional with short and strict latency requirements. Thus, approaches that are capable of UL triggering, as well as DL scheduling, may be necessary for improved QoE.

Accordingly, examples disclosed herein provide scheduling mechanisms that address the above-discussed technical short comings. For example, the present disclosure can provide mechanisms to sort, on a per TID basis, queues by weighting scheduled priority based on a specified prioritization, drain higher priority queues faster than lower priority queues based on a packet arrival rate, and employ MU grouping and transmission mode selection, such as but not limited to OFDMA, in consideration of the priority and latency requirements of the traffic flows. Examples disclose herein may also be able to track the resources needed on an AP to satisfy requirements on QoS parameters on a per-traffic flows basis and enhance QoE visibility of the overall network from a cloud perspective, thereby providing optimal QoE availability on the WLAN.

Examples of the presently disclosed technology can optimize QoE availability by prioritizing traffic flows based on a QoE score computed for each traffic flow according to specified prioritization and QoS parameters requirements. In various examples, the disclosed technology can receive data packets of a plurality of traffic flows and assign the traffic flows to a plurality of queues based on TIDs assigned to each traffic flow. Examples may determine a QoE score for each traffic flow and prioritize the data packets in the plurality of queues based on the QoE scores computed for the traffic flow. For example, data packets of traffic flows having lower QoE scores can be prioritized over traffic flows having higher QoE scores. In some examples, the QoE scores can be computed based on at least one of: a jitter parameter, a latency parameter, a packet loss parameter, a throughput parameter, and an airtime parameter. The data packets constituting each traffic flow can then be scheduled for transmission in accordance with the prioritization.

In an illustrative implementation of the examples disclosed herein, an AP of a WLAN can be configured to prioritizes certain traffic flows over other traffic flow within a queue based on QoE scores competed for each traffic flow. For example, the AP can receive data packets of a plurality of traffic flows from one or more client device (also referred to as a station or STA) and assign the traffic flows to a plurality of queues. The data packets can be assigned to queues based on TIDs that associate data packets to a particular traffic flow and based on client devices associated with the traffic flows (e.g., either as a source client device in the case of UL flows or a destination client device in the case of DL flows). The plurality of queues may be associated with ACs as known in the art. The AP, according to the present disclosure, can be configured to determine a QoE score for each traffic flow, which represents an estimate of a current QoE at the client device for a respective traffic flow. Based on the computed QoE, the AP can prioritize certain traffic flows and corresponding data packets over others within each queue. For example, data packets of traffic flows having lower QoE scores can be prioritized over data packets of traffic flows having higher QoE scores. The AP may schedule the data packets based on the prioritization for transmission in the case of DL flows or triggering for UL flows.

In an example, a QoE threshold may be set for the AP. In some examples, the QoE threshold may be defined in the SLA for the client device. In this case, any traffic flows having a QoE equal to or below the threshold may be marked for transition to another AP. In examples, candidate lists of neighboring APs can be generated based on QoE scores and supplied to the client device for transitioning low QoE scored traffic flows. The disclosed technology can therefore steer the marked traffic flows to another neighboring AP in an effort to optimize the QoE of the traffic flow, as well as other traffic flows that remain allocated to the AP.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. FIG. 1 illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which may be an office network, home network, or other network installation, for example. The primary network may be a private network, such as a network that may include security and access controls to restrict access to authorized users of the private network. Authorized users may include employees of a company at primary site 102, residents of a house, customers at a business, for example.

In the example of FIG. 1, the primary site 102 includes a controller 104, which is in communication with the network 120. The controller 104 may provide communication with the network 120 for the primary site 102. There may be other points of communication with the network 120 for the primary site 102 in addition to controller 104. Although single controller 104 is illustrated, the primary site 102 may include multiple controllers and/or multiple communication points with network 120. In some embodiments, the controller 104 may communicate with the network 120 through a router. In other embodiments, the controller 104 provides router functionality to the devices in the primary site 102. In this specification, the word "tunnel" refers to an encapsulated mode of transporting data between AP and controller.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an Access Point (AP).

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IoT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired or wireless connection 112. In the illustrated example, the switch 108 communicates with the controller 104 over a wired or wireless connection 112.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the example of FIG. 1, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be a satellite office, another floor or suite in a building, for example. The remote site 132 may include a gateway device 134 for communicating with the network 120. A gateway device 134 may be a router, a digital-to-analog modem, a cable modem, a digital subscriber line (DSL) modem, or some other network device configured to communicate with the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these client devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at the remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various servers 160a-b. In an example, servers 160a-b may comprise content servers that include various providers of multimedia downloadable and/or streaming content, including audio, video, graphical, and/or text content, or any combination thereof. Examples of content servers 160a-b include web servers, streaming radio and video providers, and cable and satellite television providers. The client devices 110a-j, 140a-d, 150a-b may request and access the multimedia content provided by the content servers 160a-b.

In another example, servers 106a-b may comprise flow optimization service server that include various information for provisioning services to client devices 110 a-j, 140a-d, 150a-b and optimizing traffic flows in accordance with the examples disclosed herein. The access points 106a-c, 136, and 146; switches 108; and gateway devices 134 and 144 may request or upload information, such as telemetry data, for optimizing rendering of services to client devices 110a-j, 140a-d, 150a-b. The information may include, but is not limited to, a measure or estimate of QoE on a per traffic flow basis (e.g., referred to herein as a QoE score); flow characteristics and other QoS measurements, such as but not limited to, jitter, delay, airtime, latency, etc.; analytics; transmission protocols (e.g., OFDMA and MU-MIMO), and the like. The information may be stored in a database, which can be communicatively coupled to the servers 160a, 160b. In examples, the servers 160a-b may be cloud-based, which would be understood by those of ordinary skill in the art to refer to being, e.g., remotely hosted on a system/servers in a network (rather than being hosted on local servers/computers) and remotely accessible.

Figure 2:
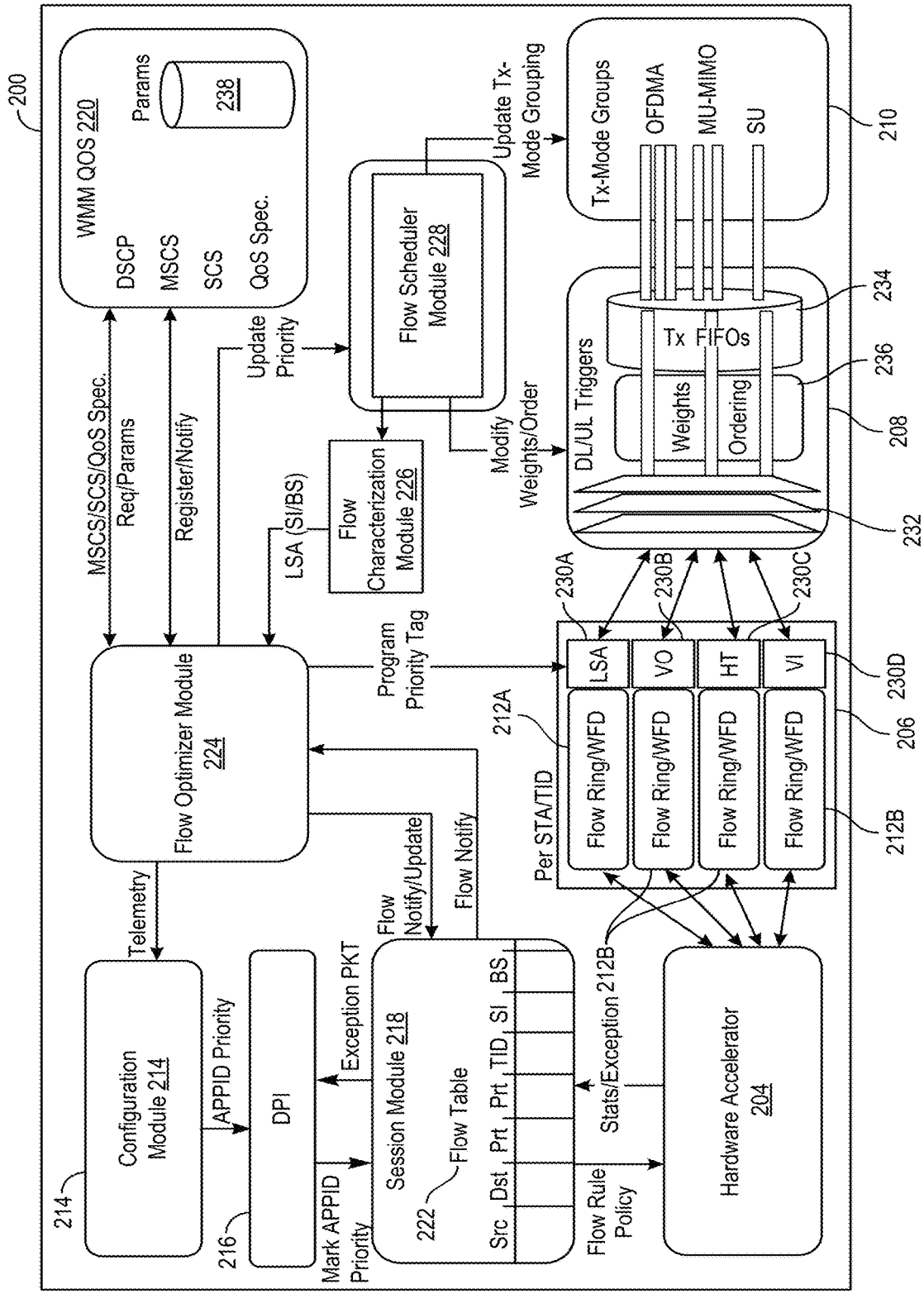
FIG. 2 is a schematic block diagram of an example architecture of a flow schedule optimizer system, in accordance with examples of the present disclosure.

FIG. 2 is a schematic block diagram of an example architecture of a flow network access device 200, in accordance with examples of the present disclosure. Network access device 200 may be implemented, for example, as any of the devices described in connection with FIG. 1 for providing client devices access to network 120. In an illustrative example, the network access device 200 can be an AP. In other examples, the network access device 200 may be implemented as a switch, a controller, gateway device, or the like.

In examples disclosed herein, the network access device 200 may be configured to prioritize traffic flows in an effort to optimize QoE at client devices based a QoE scores computed for the traffic flows. The network access device 200 may, for example, receive data packets of traffic flows from various applications and client devices and assign the traffic flows to queues based on TIDs assigned to each traffic flow. In addition, the network access device 200 may be configured to determine a QoE score for each traffic flow and prioritize the traffic flows in the plurality of queues based on the QoE scores. For example, the network access device 200 may prioritize data packets of traffic flows having lower QoE score over traffic flows having higher QoE scores. The QoE scores can be computed, for example, based on a jitter parameter, a latency parameter, a packet loss parameter, a throughput parameter, and/or an airtime parameter of each traffic flow. The network access device 200 may then schedule data packets corresponding to each traffic flow for transmission in accordance with the prioritization.

In more detail, the network access device 200, in this example, comprises a hardware accelerator 204, buffer component 206, a driver component 208, and a microcode component 210 that collectively provide for an end-to-end conduit for receiving UL data packets and/or transmitting DL data packets. In an example, the buffer component 206 may be provided as a plurality of queues that can be configured in the hardware accelerator 204 and interface with the driver component 208. The plurality of queues may comprise sets of queues, each set associated with a distinct client device and a distinct TID. TIDs may be mapped to ACs as known in the art. Thus, the buffer component 206 may comprise a distinct set of queues for each AC. FIG. 2 depicts an example set of queues 212A-212D that correspond to a particular client device and particular TID mapped to an AC. In examples, the buffer component 206 may be implemented as a ring buffer comprising a plurality of flow rings as the plurality of queues, each of which store packet descriptors in a queued order.

In the case of DL, data packets may be received at the hardware accelerator 204 from a network (e.g., network 120 of FIG. 1) and mapped to the set of queues 212A-21B based on a TID assigned to the data packet and a client device destined for the data packet. Queued data packets can enter the driver component 208, which selects a transmission protocol for each data packet (e.g., OFDMA, MU-MIMO, Single-User (SU), etc.). The data packets can then enter the microcode component 210, which employs MU grouping and mode selection, such as OFDMA or MIMO, based on priority and latency tolerances of the traffic flows to transmit data packets to client devices via a radio component (not shown in FIG. 2) of the network access device 200 (e.g., an antenna). In the case of UL, data packets may take the reverse path from the radio component through the end-to-end conduit to the hardware accelerator 204 and to the network. Further details are provided below.

In examples, the hardware accelerator 204 can be implemented as hardware, software or a combination thereof. In an example, the hardware accelerator 204 may be implemented as hardware with a wired connection (e.g., ethernet) to a network (e.g., network 120). The hardware may comprise memory storing firmware that can be executed by a processor to perform functions of the hardware accelerator 204. In some examples, the hardware accelerator 204 may comprise a runner/crossbow firmware module, as known the art, installed thereon. In examples, buffer component 206 and the driver component 208 may be implemented as software queues configured in hardware, while the microcode component 210 may be a set of hardware implemented queues.

The network access device 200 may also comprise a number of modules that can be provided as software stored in a memory. The modules can be executed by a processor to perform the functions of each module. In the example of FIG. 2, the network access device 200 comprises a configuration module 214, a data packet inspection (DPI) module 216, a session module 218, and a WMM QoS module 220. The network access device also comprises a flow optimizer module 224, a flow characterizer module 226, and a flow scheduler module 228.

In examples, the configuration module 214 may receive prioritization information, for example, from a flow optimization service server (e.g., server 160*a* and/or 160*b* of FIG. 1). The prioritization information may contain information for prioritizing traffic flows over other traffic flows received by the network access device 200. The prioritization information may contain, but not limited to, information designating traffic flows as critical traffic flows. A traffic flow may be designated as critical based on designating or otherwise specifying an application and/or client device corresponding to the traffic flow as a critical application or critical client device. The designation may include an indication that the traffic flow is a LSA traffic flow or a high throughput traffic flow in some cases. The prioritization information may also define, for each critical traffic flow, requirements on QoS parameters for satisfying QoE guarantees. For example, the prioritization information may define one or more of a service interval (SI), bit rate, burst size (BS), maximum acceptable latency, maximum acceptable jitter, maximum packet loss, and the like that a traffic flow may be required to satisfy to provide an QoE for that traffic flow. The prioritization information may be defined in an SLA in certain examples.

In some examples, the flow characterization module 226 can be configured to derive prioritization information, such as requirements on QoS parameters, by monitoring of traffic flows passing through the network access device 200. For example, the flow characterization module 226 may monitor traffic flows to obtain flow characteristics (e.g., measures of QoS and the like, such as but not limited to, a jitter parameter of the traffic flow, a latency parameter of the traffic flow, a packet loss parameter of the traffic flow, a throughput parameter of the traffic flow, and an airtime parameter of the traffic flow). The flow characterization module 226 may perform heuristic based learning on the obtained flow characteristics to learn or otherwise derive requirements on QoS parameters. The flow characterization module 226 may then supply the requirements on QoS parameters to the flow optimizer module 224. In some examples, the flow characterization module 226 may be used to provide prioritization information in an situation where the configuration module 214 does not contain the information for a particular client device and/or particular traffic flow or is otherwise not available to the network access device 202.

In some examples, the WMM QOS module 220 can be configured to set client device defined prioritization information and supply this information to the flow optimizer module 224. The client set prioritization may be similar to the prioritization information defined by the flow optimization service server, but provided by a particular client device for a specified one or more traffic flows. For example, a client device may request priority treatment of certain traffic flows, for example, using one or more Wi-Fi Alliance (WFA) protocols, such as but not limited to, Mirrored Stream Classification Service (MSCS), Stream Classification Service (SCS), and QoS specifications framework defined in the IEEE 802.11 family of standards. SCS enables a client device to specify classification and QoS treatment of specific traffic flows, and MSCS enables a client device to request the network access device 200 apply specific QoS treatment to DL traffic flows using QoS mirroring. The client device may package the prioritization information as a traffic specification (TSPEC) element and/or a QoS characteristic element, as defined in the IEEE 802.11 family of standards. Upon receiving such a request from the client device, the network access device 200 can register the information in memory, such as database 238. The WMM QoS module 220 can then supply the client device specified prioritization information to the configuration module 214 via the flow optimizer module 224.

Accordingly, the WMM QoS module 220 may be used in addition to or independent of the flow optimization service server for indicating a traffic flow priority. The network access device 200 may receive indications of traffic flow priority from a client device, which can be stored in database 238, and communicated by the WMM QoS module 220. Thus, the network access device 200 can mirror client device designated priorities for traffic flows. The WMM QoS module 220 can also specify requirements on QoS parameters, for example, using one or more of the WFA protocols (e.g., QoS specifications framework in an example).

In examples, the configuration module 214 may use the prioritization information for assigning TIDs to traffic flows that enter the hardware accelerator 204 according to DSCP values set in data packets that make up the traffic flows. For example, when a data packet enters the hardware accelerator 204, the hardware accelerator 204 accesses the session module 218 to check a flow table 222 for a session established for a traffic flow corresponding to the data packet. If a session is not logged in the flow table 222, the hardware accelerator 204 triggers an exception path and feeds the data packet to the DPI module 216. The DPI module 216 examines the header and payload of the data packet to extract identifying information, such as but not limited to, a DSCP value in the header of the data packet to match with the application identifier of an originating application (or destination application). In examples, the application identifier may be a unique string of numeric or alpha numeric characters for each application associated with each data packet (e.g., an application identifier for Dropbox may be 779 and an application for Zoom may be 2928). The DPI module 216 also obtains the prioritization information from the configuration module 214 for the identified application in addition to the application identifier to assign a priority to the data packet. For example, the DPI module 216 may assign a TID to the data packet, and ultimately the corresponding traffic flow, based on the DSCP value and the prioritization information. The DPI module 216 feeds the priority for the traffic flow to the session module 218, which generates a flow signature for the traffic flow and populates the flow table 222 with the flow signature. In the example of FIG. 2, a flow signature for a given traffic flow may hold a source identifier of the originating device (e.g., client device for a UL or another network device for a DL) on the network (e.g., MAC address, IP address or the like), destination identifier of a destination device (e.g., a client device for a DL or another network device for a UL), input port, output port, TID assigned to the traffic flow, service interval (SI), bit rate, and burst size (BS).

The session module 218 may be configured to program traffic flows, contained in the flow table 222, in the hardware accelerator 204. For example, session module 218 may program the hardware accelerator 204 with a flow rule policy for each flow signature contained in the flow table 222. In this way, the hardware accelerator 204 may be configured to recognize incoming data packets as associated with a particular traffic flow and feed the data packets to the buffer component 206 according to the TID of the traffic flow based on the flow rule policy.

The session module 218 may also be configured to notify a flow optimizer module 224 that traffic flows logged in the flow table 222 are prioritized flows. The flow optimizer module 224 can may associate each prioritized traffic flow with a priority tag and program each priority tag 230A-230D to one of queues 212A-212D. In the example of FIG. 2, priority tags may be provided as, for example but not limited to, a latency sensitive application (LSA) tag 230A, a voice (VO) application tag 230B, a high throughput application (HT) tag 230C, and video (VI) application tag 230D. The priority tag allocated to a particular traffic flow may be based on the prioritization assigned (e.g., flow rule policy) to the traffic flow based on the prioritization information. For example, based on the requirements on QoS parameters specified in the prioritization information at the configuration module 214, certain traffic flows can be designated as LSA traffic flows (e.g., according to a service interval specified in the QoS parameters) or high throughput traffic flows (e.g., according to a bit rate specified in the QoS parameter). Non-limiting examples of high throughput traffic flows includes, but are not limited to, traffic flows from bulk file sharing applications, such as OneDrive, Sharepoint, and the like. These examples may involve large quantities of traffic throughput and may not define a service interval, thus examples disclosed herein can be designated as high throughput traffic flows. Non-limiting examples of LSA traffic flows includes, but are not limited to, traffic voice calls, traffic flows for VoIP and other Wi-Fi calling applications, collaborative video confercing applications (e.g., Zoom, Microsoft Teams, etc.), and the like. Such traffic flows may be recognized by observing relatively consistent periodicity of data packets for each flow (e.g., traffic flows exhibiting non-burstiness characteristics). By programming the priority tags in the buffer component 206 and notifying the session module 218 of the priority tag allocated to each traffic flow, the hardware accelerator 204 can associate a particular traffic flow with a particular queue based on the priority tag, which can ensure that traffic flows can be pushed to the appropriate queue. For example, if a traffic flow is designated by the flow optimizer module 224 as a LSA traffic flow, this traffic flow can be pushed to the queue programmed with the LSA tag 230A.

The queues 212A-212B may be used such that a client device can be configured to pull data packets from a queue having a higher priority than other queues. For example, the driver component 208 may comprise a plurality of station control blocks (SCBs) allocated on a per client device basis. That is, for example, the driver component 208 may comprise SCBs, subsets of which can be associated with a particular client device. Thus, in this example, the set of queues 212A-212D may correspond to a set of SCBs 232 according to the client device associated with the set of queues 212A-212D. Data packets buffered in the queues 212A-212D can be pulled into the SCBs 232, as known in the art, and queued into a First-in-First Out (FIFO) block 234.

A weighting block 236 may operate on the data packets between the SCBs 232 and FIFO block 234 that can prioritize data packets of certain traffic flows over others by applying a weight to each traffic flow. In an example, weights can be programmed based on a scheduled priority determined at the flow scheduler module 228. For example, the weights may be relative weights for a particular client device and TID pair with respect to other pairs of client devices and TIDs. The weights may control the order in which a particular TID for that specific client is serviced with respect to other pairs of client devices and TIDs. The weights may be provided as a numerical weight (e.g., on a scale of 1 to 100 as an example) and may be subject to how many high priority traffic flows can be serviced by the network access device 202 simultaneously. In this way, different traffic flows can be treated according to a determined priority for that traffic flow. For example, the flow characterizer module 226 may analyze traffic flows to determine current flow characteristics (e.g., measures of QoS and the like), such as but not limited to, a jitter parameter of the traffic flow, a latency parameter of the traffic flow, a packet loss parameter of the traffic flow, a throughput parameter of the traffic flow, and an airtime parameter of the traffic flow. The flow characterizer module 226 may monitor flow characteristics on a per traffic flow basis and report the characteristics to the flow optimizer module 224.

The flow characterizer module 226, in some examples, can monitor DL and/or UL data packets to determine a total transmission latency ($TX_{Latency}$) and total reception latency ($RX_{Latency}$), respectively. For example, for DL, flow characterizer module 226 may measure an amount of time for a data packet to pass from the hardware accelerator 204 to the microcode component 210 to determine a transmission data path delay latency (TX (Datapath)) and a transmission completion latency ($Tx_{tCompletion}$). The difference between these two measures may can provide total transmission latency ($TX_{Latency}$). In the case of UL, flow characterizer module 226 may monitor a time that the microcode component 210 sends a trigger to the client device ($RX_{tTrigger}$) and a time that the data packet is received ($RX_{tPacket}$). The difference between these two measures may can provide total reception latency ($RX_{Latency}$).

The flow optimizer module 224 may update a priority for traffic flows at the flow scheduler module 228 based on the flow characteristics monitored by the flow characterizer module 226 and assigns weights to each traffic flow according to the updated priority. In various examples, the flow optimizer module 224 can compute a QoE score for each traffic flow based on the flow characteristics. In some examples, the QoE scores may be provided to the flow scheduled module 228 and translated to weights used to prioritize certain flows. To ensure optimal QoE, traffic flows having lower QoE scores can be prioritized over traffic flows having higher QoE scores in an effort to improve the QoE of the traffic flows. In an example, weights may be proportional to the QoE scores, such that lower weights are applied to traffic flows having lower QoE scores, and lower weighted traffic flows can be prioritized over higher weighted traffic flows. In another example, weights may be inversely proportional to the QoE scores, such that higher weights are applied to traffic flows having lower QoE scores, and higher weighted traffic flows can be prioritized over lower weighted traffic flows.

In examples, a QoE score for a given traffic flow ($QoE_{flow}$) may be computed as follows:

$$QoE_{flow} = QoE_{MaxNormalized} - QoS_{flow} \quad \text{Eq. 1}$$

where $QOE_{MaxNormalized}$ represents a normalization factor that may be set on a scale of 1 to 10. $QoS_{flow}$ represents the QoS for that traffic flow, which can be computed as:

$$QoS_{flow} = \frac{(Weight_{AvgLatency} \times Flow_{Latency} + Weight_{Jitter} \times Flow_{jitter} + Weight_{PacketLoss} \times Flow_{PacketLoss})}{(Weight_{AvgLatency} + Weight_{Jitter} + Weight_{PacketLoss})} \quad \text{Eq. 2}$$

where $Wieght_{AvgLatency}$, $Wieght_{jitter}$, and $Wieght_{PacketLoss}$ are configurable weights that can be set as desired for a particular application. $Flow_{Latency}$; $FLOW_{jitter}$; and $Flow_{PacketLoss}$ can be computed as follows:

$Flow_{Latency} = [$ Eq. 3

Normalized Moving Average of Last $m$ values for $Tx_{Latency}$ for $DL$ flow or $Rx_{Latency}$ for $UL$ flow]

$Flow_{PacketLoss} = $ [Normalized count of packets dropped during JitterBufferWindow] Eq. 4

$Flow_{jitter} = \sum_{n=1}^{n=m} (Flow_{Latency,n} - Min_{AvgLatency}) + Flow_{JitterPeak}$ Eq. 5

Where

JitterBufferWindow = [$Flow_{Latency,1}$, $Flow_{Latency,2}$, ... $Flow_{Latency,n}$] Eq. 6

$Flow_{JitterPeak} = $ [Normalized ($Max_{AvgLatency} - Min_{AvgLatency}$) in the JitterBufferWindow] Eq. 7

As alluded to above, total transmission latency ($TX_{Latency}$) and total reception latency ($RX_{Latency}$) can be computed as follows:

$$Tx_{Latency} = Tx_{tDatapath} - Tx_{tCompletion} \quad \text{Eq. 8}$$

$$Rx_{Latency} = Rx_{tTrigger} - Rx_{tPacket} \quad \text{Eq. 9}$$

The flow optimizer module 224 may compute QoE scores for each traffic flow on the network access device 200. The flow optimizer module 224 can also provide the QoE scores to the configuration module 214 as telemetry data, which communicates the QoE scores to the flow optimization service server. The flow optimization service server (e.g., server 160a and/or 160b) may record the telemetry data in a database.

The flow optimization service server may also maintain a set of lists for the LSA traffic flows and a set of lists for the high throughput traffic flows. Each set of lists may comprise traffic flows ordered based on QoE scores. For example, for the LSA traffic flows, a first list may be provided that orders the traffic flows according to the actual (or current) QoE scores (e.g., from highest QoE score to lowest QoE score) computed using the flow characteristics obtained by the flow characterizer module 226 applied to Eq. 1-9 above. A second list may be provided that orders the traffic flows according to a desired QoE score (e.g., from highest QoE score to lowest QoE score) computed using the QoS parameter requirements specified in the prioritization information applied to Eqs. 1-9 above. Similarly computed and ordered lists may be maintained for the high throughput traffic flows.

Figure 3:
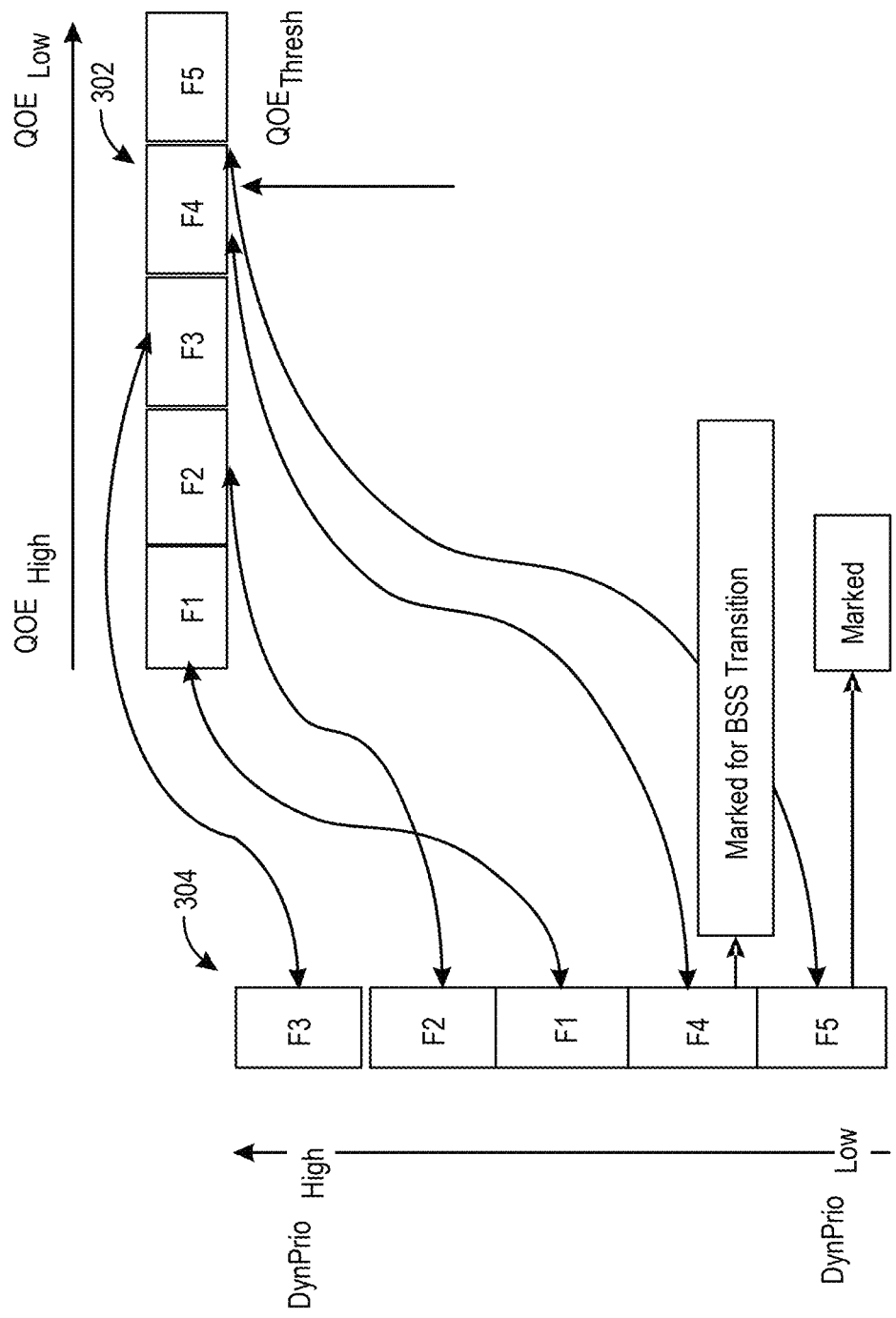
FIG. 3 depicts a schematic block diagram of dynamic prioritization of traffic flows based on Quality of Experience (QoE), in accordance with examples of the present disclosure.

For example, FIG. 3 depicts a schematic block diagram of dynamic prioritization of traffic flows based on QoE scores. In the example of FIG. 3, with reference to network access device 200, the session module 218 may maintain sessions for five traffic flows F1 through F5, which may be classified as LSA traffic flows or high throughput flows, as described above. The flow optimizer module 224 may compute a current QoE score for each traffic flow and generate first list 302 comprising the traffic flows F1 through F5 ordered from highest QoE (e.g., $QoE_{High}$) to lowest (e.g., $QoE_{Low}$). The flow optimizer module 224 may generate a second list 304 by dynamically reordering the first list by applying a weight to the current QoE scores as a function of the SI and a priority set by the prioritization information (e.g., as obtained from an SLA, heuristic based learning, and/or specified by a client device). For example, priority may be a function of SI and a QoE score. As an illustrative example, a higher weight may be applied to a traffic flow having an SI of 20 ms and a QoE score of 5 with respect to a traffic flow having an SI of 30 ms and QoE score of 5. Thus, the order of the traffic flows may be changed to prioritize traffic flows having lower QoE scores as a function of SI and priority. In the example of FIG. 3, flow optimizer module 224 determined an optimal order of the traffic flows in the order of traffic flow 3 having the highest dynamic priority, followed by traffic flows 2, 1, 4, and 5 in that order.

Returning to FIG. 2, the flow optimizer module 224 can therefore compute QOE scores for LSA traffic flows as a function of flow characteristics, as described above. Flow characteristics can be defined by the flow characterizer module 226 based on burst size, duration, and the service interval. Accordingly, the flow scheduler module 228 can dynamically determine a priority order of traffic flows based on the actual (e.g., current) QoE computed by the flow optimizer module 224 for each traffic flow, weighted by the service interval, bit rate, burst size of each flow and priority (e.g., as defined by the periodization information), which can be sorted in a list, as described above in connection with FIG. 3, in an order from high to low. Based on the order defined in the flow scheduler module 228, the driver component 208 can configure a latency sensitive scheduling mode, monitor the transmission/receptions for each traffic flow, and adjust a scheduler priority order and OFDMA grouping, in the microcode component 210, for higher ordered flows in the list.

Similarly, the flow optimizer module 224 can compute QoE scores of a high throughput traffic flow as a function of flow characteristics, as described above. Accordingly, the flow scheduler module 228 can dynamically determine a priority order of the high throughput traffic flows based on the current QoE scores weighted by the priority (e.g., as defined by the SLA) and monitor the pending queue depth of the buffer component 206. Weights can be dynamically adjusted for the higher ordered traffic flows in the list to increase the priority set by the flow scheduler module 228 and fine tune transmissions to allow more packets to be drained from the queues. A higher queue depth can imply relatively more airtime, and OFDMA selection can be performed as an inverse function of the airtime to optimize throughput.

The flow characterizer module 226 may continuously or periodically track latencies between data packets on the UL and/or DL. This tracking can be used to continuously update the flow optimizer module 224 and fine tune scheduling by the flow scheduler module 228 to provide dynamically improve successful OFDMA transmissions, which can help in reducing the latency and improve the QOE score for traffic flows.

In examples, the flow optimizer module 224 can be configured recommend traffic flows to transition to another network access device based on a QoE score for the traffic flows. For example, a QoE threshold may be set in advance. In some examples, the QoE threshold may be defined in prioritization information, for example, in an SLA or client device specified at the WMM QoS module 220. The flow optimizer module 224 may compare a current QoE score to the QoE threshold and, based on the comparison, the flow optimizer module 224 may mark one or more traffic flows for transition from the network access device 200 and to another network access device. For example, FIG. 3 also depicts an instance where the flow optimizer module 224 has identified one or more traffic flows for transitioning to another network device (e.g., another Basic Service Set or BSS). In this example, the current QoE scores for traffic flows F4 and F5 are equal to or less than the QoE threshold. Accordingly, the traffic flows F4 and F5 can be dynamically prioritized below the other traffic flows F1-F3 in the reorder list and marked for transition. In some examples, the flow optimizer module 224 may send a notification to the client device to initiate a handover to another BSS/network access device.

In some examples, the flow optimizer module 224 may receive recommendations from the flow optimization service servers of candidate network access devices for steering the traffic flow thereto. The recommendations may be based on load-balancing of traffic between the network access device 200 and neighboring network access devices. In some examples, the candidate network access devices may be based on QoE scores, as described below in connection with FIGS. 4 and 5. The flow optimizer module 224 can request the network access device 200 transition offending traffic flows (e.g., traffic flows F4 and F5 in this example) to another network access device. For example, flow optimizer module 224 may send a BSS transition management request to the client device requesting such transitions.

Figure 4:
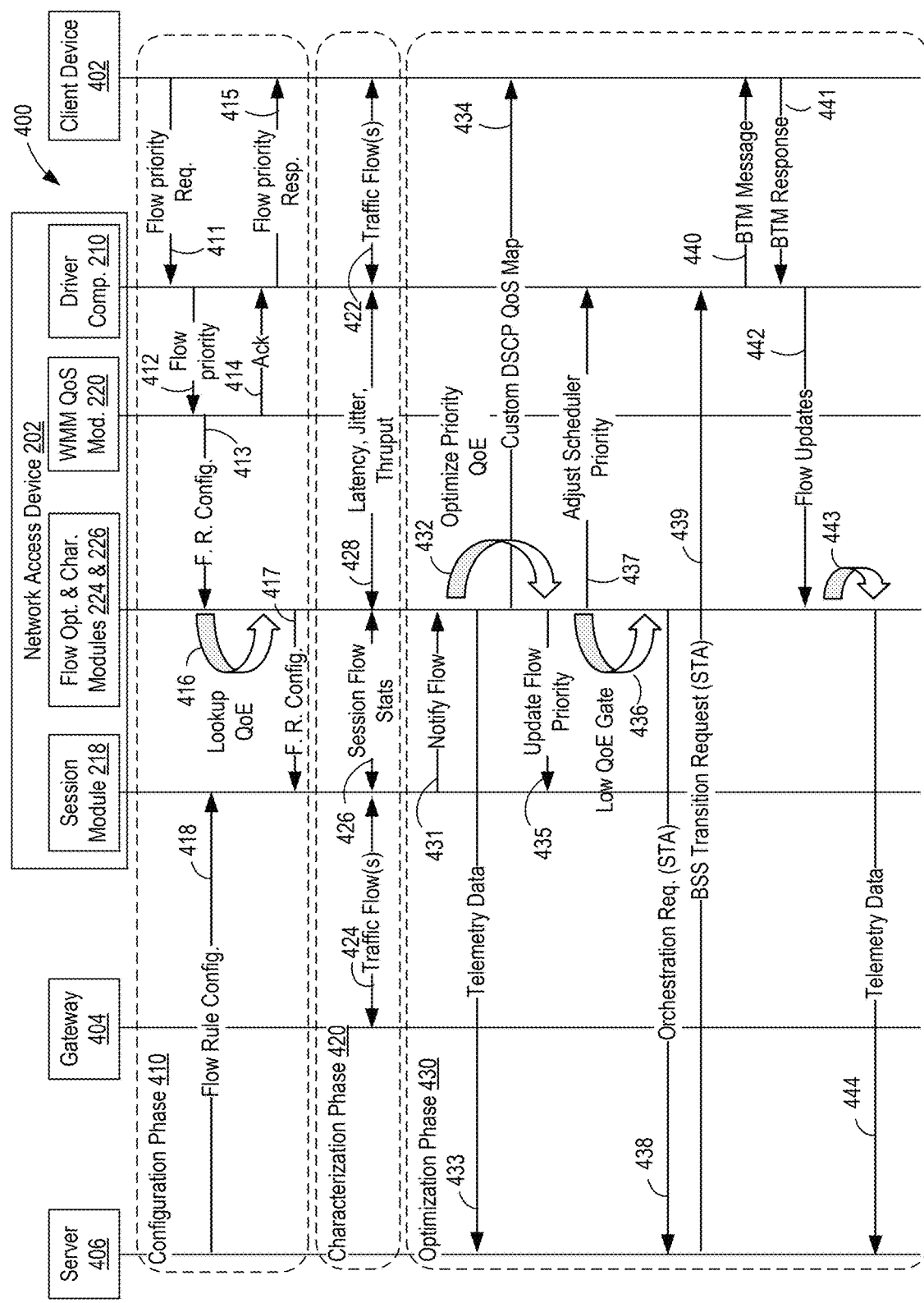
FIG. 4 is an example message flow of flow schedule optimization, in accordance with examples of the present disclosure.

FIG. 4 is an example message flow 400 of traffic flow schedule optimization, in accordance with examples of the present disclosure. The message flow 400 can be performed, for example, by the network access device 200 of FIG. 2 communicably coupled to a client device 402 (e.g., an example implementation of one of client devices 110a-j, 140a-d, and 150a-b). The network access device 200 of FIG. 2 is also communicably coupled to a server 406 via a gateway 404. Server 406 may be an example flow optimization service server (e.g., one of servers 160a and/or 160b). FIG. 4 depicts an example exchange of messages for a single client device; however similar message flows may be carried out for a number of client devices connected to network access device 200. While FIG. 4 depicts certain components of network access device 200, this is for illustrative purposes only. It will be appreciated that the network access device 200 shown in FIG. 4 may include each of the components and modules described above in connection with FIG. 2.

The message flow 400 may comprise multiple phases. In the example of FIG. 4, the message flow comprises a configuration phase 410, a characterization phase 420, and an optimization phase 430. During the configuration phase 410, the network access device 200 may configure a context for a give client device (e.g., client device 402 in this example). The context may contain prioritization information of multiple traffic flows on a traffic flow basis for client device 402. During the characterization phase 420, the network access device 200 can monitor the traffic flows according to the configured context, obtain flow characteristics, and compute QoE scores for each traffic flow based on the flow characteristics. During the optimization phase 430, the network access device 200 can optimize a scheduled priority of the traffic flows based on the QoE scores, as well as based on the configured context.

In more detail, the configuration phase 410 may comprise of the client device 402 transmitting one or more requests to prioritize traffic flows as one or more messages 411. Each message 411 may contain prioritization information, such as designating traffic flows as critical by specifying critical applications. For example, a message 411 may contain a DSCP value designating a prioritization for a particular traffic flow as critical. Each message 411 may also define requirements on QoS parameters for satisfying QoE guarantees for the corresponding traffic flow. For example, a message 411 may define one or more of a SI, BS, maximum acceptable latency, maximum acceptable jitter, maximum packet loss, and the like for one or more traffic flows. In certain examples, messages 411 may be communicated using one or more of the WFA protocols, such as but not limited to, MSCS, SCS, QoS specifications framework, and the like, as defined by the IEEE 802.11 family of standards.

The one or more messages 411 may be received by the driver component 208 of the network access device 200 via a radio component of the network access device 200. Upon receiving a message 411, the driver component 208 may forward the contents of the message 411 to the WMM QoS module 220 as message 412, which transmits one or more flow rule configuration messages 413 to the flow optimizer module 224, for each traffic flow for which a message 411 was received by the network access device 200. The WMM QOS module 220 may associate the prioritization information contained in the message 411 with the particular traffic flow at the network access device 200. The WMM QoS module 220 may associate each traffic flow with the prioritization information in database 238 and package this information into message 413 provided to the flow optimizer module 224. For example, WMM QOS module 220 may assign a TID to the traffic flow according to the DSCP value set in the related message 411 and package this TID with requirements on QoS parameters specified in message 411. The WMM QoS module 220 may transmit an acknowledgment message 414 to the driver component 208 confirming setup of the prioritization information, which forwards the confirmation to the client device as a flow priority response message 415.

Flow optimizer module 224 performs process 413 for each traffic flow associated with a message 411. Flow optimizer module 224 may maintain a list of traffic flows according to TIDs and client devices and previously measured QoEs (e.g., measured according to Eqs. 1-9 above) for each traffic flow. Process 413 may comprise locating the list for a particular client device (e.g., client device 402 in this example) and looking up the TID and the corresponding measured QoE for each traffic flow for which a message 411 was received. The flow optimizer module 224 may add the measured QoE for each traffic flow to the contents of message 413 and forward the information to the session module 218 as one or more flow rule configuration messages 417.

The session module 218 may construct a context for the client device 402 based on the one or more messages 417. For example, each flow rule configuration message 417 may instruct the session module 218 to configure a flow rule policy for the corresponding traffic flow according to prioritization information (e.g., the TID and measured QoE) set at process 416. For example, the session module 218 may amend or otherwise create a flow signature for the traffic flow according to the TID and measured QoE, which can be used to populate flow table 222 as described above in connection with FIG. 2. The flow table 222 may be used to configure the context for the client device 402.

In examples, session module 218 may receive a flow rule configuration message 417 from server 406 via gateway 404. The context for the client device 402 can be configured based on messages 416. For example, the flow rule configuration message 416 may instruct the session module 218 to configure a flow rule policy for the traffic flow according to prioritization information specified by the server 406. For example, the server 406 may hold an SLA for the client device 402 that specifies a criticality of certain applications and, thus, a priority of traffic flows originating from or destined for those applications. That is, for example, the SLA may specify that certain applications originating or destined for traffic flows are critical applications and specify QoS parameter requirements for those traffic flows. Similar to message 416, the session module 418 may amend or otherwise create flow signatures for the traffic flows according to prioritization information contained in message 417, which can be used to populate flow table 222 as described above in connection with FIG. 2. As noted above, the flow table 222 may be used to configure the context for the client device 402.

Examples herein may include one of or both of messages 416 and 417. That is, for example, flow rule policies may be constructed for traffic flows from prioritization information received via message 417 and/or message 416. In some examples, flow rule policies may be set using only that prioritization information received from server 406, while in others flow rule policies may be set using only that prioritization information specified by client device 402. In other examples, both server 406 and client device 402 may specify prioritization information that can be used to construct flow rule policies.

During the characterization phase 420, flow characteristics of each traffic flow can be monitored by the flow characterizer module 226 and reported to the flow optimizer module 224. Data packets for each traffic flow can be exchanged between (e.g., transmitted to and/or received from) client device 402 and the driver component 208 as part of one or more traffic flows illustratively depicted as messages 422. Similarly, data packets for each traffic flow can be exchanged between (e.g., transmitted to and/or received from) the session module 218 and gateway 404, and ultimately the network, as part of one or more traffic flows illustratively depicted as messages 424. As described above, data packets traverse the end-to-end conduit of the network access device 200 in either an UL or DL direction. In either case, hardware accelerator 204 (not shown in FIG. 2) passes the data packets to the session module 218.

For each traffic flow specified by the session module 218 in the flow table 222, the session module 218 provides a session flow stats message 426 to the flow optimizer module 224. The session module 218 may collect various stats for each traffic flow, such as but not limited to, counts of data packets transmitted and received on a per flow basis (e.g., throughput), retry rates, a time duration for each traffic flow, channel utilization, and the like.

Based on data packets passing through the driver component 208, the flow characterizer module 226 monitors current flow characteristics of each traffic flow. For example, the driver component 208 passes data packet statistics to the flow characterizer module 226 as message 428, which obtains or otherwise measures QoS parameters, such as but not limited to, a current jitter parameters, latency parameters, packet loss parameters, throughput parameter, and/or airtime parameter for each traffic flow. The obtained flow characteristics can be provided to the flow optimizer module 224. The flow optimizer module 224 can compute current QoE scores for each traffic flow using the flow characteristics, for example, according to Eqs. 1-9 above.

For each traffic flow, the session module 218 may send a message 431 to the flow optimizer module 224 notifying the flow optimizer module 224 that a data packet for a given traffic flow has been received. The message 431 may indicate a client device (e.g., client device 402 in this example) and a TID for the traffic flow, along with the flow rule policy for that traffic flow as defined in the context for the client device 402. For example, the session module 218 may locate the flow signature of a traffic flow associated with the data packet from the flow table 222, such as by using the TID of the traffic flow according to a DSCP map. The session module 218 may then access the context and forward the flow rule policy of the traffic flow to flow optimizer module 224 as message 431

Upon receiving message 431, the message flow enters the optimization phase 430. During the optimization phase 430, the flow optimizer module 224 monitors the QoE scores and dynamically optimizes a scheduled priority of the traffic flows based on the QoE scores. For example, the flow optimizer module 224 can execute process 432 to optimize the scheduled priority of the traffic flow based on current QoE scores computed based on message 428. For example, the flow optimizer module 224 can obtain current flow characteristics from the flow characterizer module 226 via message 428 and compute a current QoE score for the traffic flow, as described above. The flow optimizer module 224 also obtains most recent QoE scores of other traffic flows for the client device 402 and/or updates the QoE scores of other traffic flows by computing a current QoE score for each traffic flow. Process 432 may including generating a first list of traffic flows order accord to current QoE scores, for example, from highest QoE score to lowest QoE score. A second list can then be generated from the first list by applying weights to each current QoE score based on the prioritization information of the flow rule policies for each traffic flow, as described above in connection with FIGS. 2 and 3. For example, weights may be computed as a function of SI, as well BS and priority, set forth in the flow rule policy. Process 432 provides the second list of the traffic flows ranked according to a dynamic priority (e.g., weighted current QoE) from highest dynamic priority to lowest.

During process 432, the flow optimizer module 224 may supply telemetry data to the server 406 via gateway 404. For example, the flow optimizer module 224 may package current QoE scores on a traffic flow basis for the client device 402 as message 433. The current QoE scores may be associated with the client device and a TID for each traffic flow.

Process 432 may also include generating a custom DSCP QoS map of the traffic flows, which can be provided to the client device 402 as message 434. The custom DSCP QoS map may indicate changes to the mapping of DSCP values to TIDs according to the second list generated during process 432. For example, if a priority of a traffic flow is increased in the second list (e.g., higher dynamic priority), process 432 may determine that a higher TID can be assigned to the traffic flow and this higher TID can be indicated to the client device 402 in message 434.

Once process 432 is complete, the flow optimizer module 224 instructs the session module 218 to update the flow priorities in the flow table 222 via message 435. Thus, the optimized schedule priority can be specified for the traffic flows and carried over to subsequently received data packets.

The flow optimizer module 224 can execute process 436 to gate the second list of dynamically prioritized traffic flows based on a set QoE threshold. For example, flow optimizer module 224 may compare current QoE scores for each traffic flow to the QoE threshold and place any traffic flows having a QoE score that is less than or equal to the QoE threshold lower on the second list (even if the dynamic priority would otherwise suggest the traffic flow be ordered higher on the list). The flow optimizer module 224 may then adjust the scheduled priority of traffic flows by supplying the second list, gated according to process 436, to the driver component via message 437.

In examples, the flow optimizer module 224 may request network orchestration by the server 406 via message 438. Message 438 may request network orchestration for any reason desired. In an example, message 438 may be responsive to comparison between current QoE scores and a QoE threshold. For example, in response to identifying traffic flows that have QoE scores equal to or below the QoE threshold, the flow optimizer module 224 may request the server 406 perform network orchestration for the client device 402 to reconfigure or otherwise identify other network access devices (e.g., AP or the like) for transitioning the traffic flows gated in process 436 away from the network access device 200. In another example, message 438 may be responsive to a determination that the network access device 200 cannot accommodate the client device 402, as described in greater detail below in connection with FIG. 5.

The server 406 may respond to message 438 with message 439. Message 439 may be a BSS transition request. The BSS transition request may include a candidate list of one or more neighboring network access devices recommended by the server 406 for transitioning the gated traffic flows. In some examples, the candidate list may be obtained by applying a matching algorithm, as described below in connection with FIG. 5. The driver component 208 may forward the candidate list as a BSS transition management (BTM) message 440 to the client device to request the client device transition the gated traffic flows to one or more network access devices of the candidate list. The client device 402 may respond with a BTM response message 441 informing the network access device whether the client device 402 accepts or denies the transition request. The driver component 208 may instruct the flow optimizer module 224 to update the second list of traffic flows via message 442 based on the BTM response message 441 (e.g., updating the traffic flow order where traffic flows have been transitioned). The optimizer module 224 may then update the second list of traffic flows at process 444. The flow optimizer module 224 may then report the updates lists and any transitions to the server 406 via telemetry data message 443, which may be similar to message 433 described above.

When the client device receives the BTM request message 440, the client device can accept or reject the request. If the client device 402 accepts the BTM request and transitions traffic flows to the identified network access device, the client device 402 may send a BTM response with reason code of ACCEPT to the network access device 200. If the client device rejects the request and does not transition, the client device 402 may send reason code of REJECT. If the client device 402 does not response within a defined time period, the BTM request of message 440 may be timed out. In any event, the flow optimizer module of the network access device 200 may record these events based on message 442.

Figure 5:
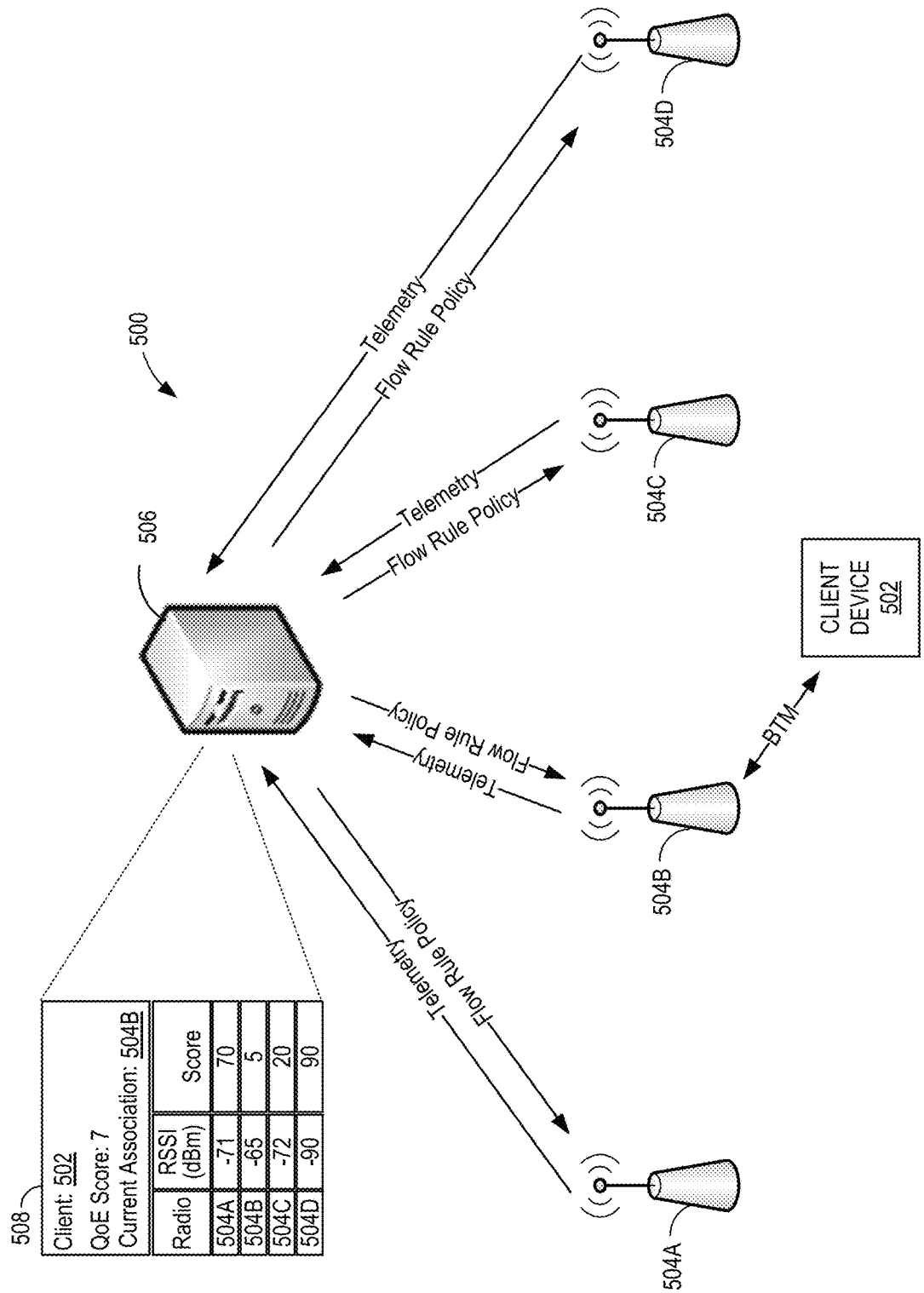
FIG. 5 is a schematic block diagram of a system for orchestrating traffic flows based on QoE, in accordance with examples disclosed herein

FIG. 5 is a schematic block diagram of a system 500 for orchestrating traffic flows based on QoE, in accordance with examples disclosed herein. System 500 comprises a server 506 that is communicably coupled to a plurality of network access devices 504A-504D. System 500 also includes a client device 502 configured to access a network (e.g., network 120) via one or more of the plurality of network access devices 504A-504D. Server 506 may be an example implementation of one of servers 160a or 160b implemented as flow optimization service server. Network access devices 504A-504D may each be an example instance of network access device 200 configured to perform the functions described in connection with FIGS. 2-4. Client device may be implemented, for example, as any one of client device 110 a-j, 140a-d, 150a-b and/or client device 402.

Server 506 may be configured to use telemetry data derive a measure of QoE that can be used to maintain a state of the network. For example, each network access device 504A-504D can be configured to provide telemetry data to the server 506 as described above (e.g., message 433 of FIG. 4). The telemetry data may comprise, among other things, QoE scores for traffic flows passing through each network access device 504A-504D. In examples, each network access device 504A-504D may comprise a flow optimizer module (e.g., flow optimizer module 224 of FIG. 2) that may provide telemetry data to the server 506 as described above (e.g., message 433 of FIG. 4).

In examples, the server 506 may generate and maintain a view of the network (e.g., network 120). In the example of FIG. 5, server 506 may create a view in the form of one or more instances of table 508, where each instance is representative of the network with respect to a particular client device. In the example of FIG. 5, table 508 is a simplified representation of the network for client device 502. The server 506 may populate the table 508 with a list of network access devices within a communicable reach of the client device 502 (e.g., network access devices that are available to the client device for establishing connections), including any network access devices to which the client device 502 is currently connected. In the example of FIG. 5, network access devices 504A-504D are examples of network access devices available to client device 502 and client device 502 is currently connected to (e.g., associated with) to network access device 504B. For each network access device 504A-504D, the server 506 may determine an availability score (sometimes referred to herein as a radio availability score) from the telemetry data received form each network access device 504A-504D. The server 506 may also determine and populate the table 508 with Received Signal Strength Indicators (RSSI) between each network access device 504A-504D and client device 502 as measured by the network access devices 504A-504D. Furthermore, the server 506 may determine a client QoE score for each client device, including client device 502 as shown in table 508.

In an example, the server 506 may determine the availability scores as a function of a number of traffic flows passing through each network access device 504A-504D ranked according to priority and device statistics, such as but not limited to, channel utilization, retry rate, and throughput. In one example, an availability score may be computed as an aggregate of client QOE scores for client devices associated with a particular network access device, along with additional radio level attributes, such as but not limited to, channel utilization, retry rate, and an aggregate throughput on the network access device. FIG. 5 provides some illustrative availability scores computed according to an illustrative example. The numbers depicted in FIG. 5 are not intended to be limiting and are provided as examples to illustrate the examples described herein.

The client QoE scores for a particular client device, such as client device 502, may be determined based on QoE scores of traffic flows associated with the client device. In an example, the client QoE score may be computed by aggregating the QoE scores of each traffic flow originating from or destined for the client device 502, weighted by the priority of each traffic flow. In an example, a client QoE score may be computed by weighting an average of the QoE scores of each traffic flow originating from or destined for the client device 502. A higher priority traffic flow (e.g., lower QoE score) may be translated to a higher weight with respect to lower priority traffic flows. In the example of FIG. 5, the client device 502 is shown having a client QoE score of 7, which is provided as an illustrative example.

In operation, after a client association and exchange of WMM QOS parameters (e.g., messages 411 of FIG. 4) between a network access device and a client device 502, the network access device can decide if the network access device can accommodate the client device 502 using the flow optimizer module of the network access device. For example, the network access device may execute an admission control (ADM CTL) decision based on a determination on whether the network access device has enough resources to honor the QoE requirements of traffic flows for the client device. The determination by the network access device may be based on one or more of: static limitation according to hardware and firmware resources of the network access device and dynamic consideration based on the computed QoE score for traffic flows corresponding to the client device. If client device 502 can be accommodated, the network access device adds the client device to its flow table (e.g., flow table 222) and allocates resources to traffic flows corresponding to client device 502. If the client device 502 cannot be accommodated, the network access device may send an ADM CTL notification to the server 506.

If the server 506 receives an ADM CTL notification for a given client device, the server 506 may follow steps in a QoE matching algorithm, described below in connection with FIG. 6, to identify a suitable network access device for the client device. After a network access device has been identified, the server 506 can send a request to the identified network access device to trigger a BTM request to steer the client device to the identified network access device. For example, if network access device 504A determined that it could not accommodate the client device 502, the server 506 may have identified network access device 504B as a suitable network access device. The server 506 may then send a trigger to network access device 504B to send a BTM request to the client device 502, as shown in FIG. 5.

If the client device can be accommodated, the server 506 may continue to receive telemetry data for traffic flows to and from the client device. The telemetry data, may include QoE scores for each traffic flow, as described above in connection with FIG. 4. The server 506 may aggregate the per-flow QoE scores to compute the client QoE score by weighting the individual QoE scores with prioritization information for each traffic flow set forth in the flow rule policies, as described above. If the client QoE falls below a threshold QoE value, the server 506 may execute the QoE matching algorithm to identify a network access device that is more suited to service the client device. The server 506 may then supply this recommendation to a flow optimizer module of the associated network access device, which may then decide whether or not to steer the client device 502 to the identified network access device.

When client device 502 receives a BTM request to steer to an identified network access device, the client device 502 can accept or reject the request. If the client device 502 accepts the BTM request and transitions traffic flows to the identified network access device, the client device may send a BTM response with reason code of ACCEPT to the associated network access device. If the client device 502 rejects the request and does not transition, the client device may send reason code of REJECT. In the example of FIG. 5, client device 502 may receive a BTM request from network access device 504B requesting the client device 502 steer to an identified network access device (e.g., one of network access devices 504A, 504C, or 504D) and client device 502 may response with a BTM response as set forth above. If the client device 502 does not response within a defined time period, the BTM request may be timed out. In any event, the flow optimizer module of the network access device associated with the client device (e.g., network access device 504B in this example) will record these events and forward the related information to the server 506.

Upon receiving a BTM response including a code of ACCEPT, the flow optimizer module of the network access device to which the client device 502 is transitioned can update its flow table and flow rule policies. The server 506 may update the availability score of the network access devices dynamically to consider the QoS parameter requirements of all the traffic flows to or from the client device 502 now transitioned to the new network access device. Similarly, the availability score of the previous network access device can be updated to reflect that the client device 502 has been moved away from it and that resources are now available for other traffic flows.

While the above description is made with reference to transition a client device 502 from one network access device to another, examples herein may be applied on a per-traffic flow basis. That is, for example, one skilled in the art would understand that BTM requests may be used to identify one or more traffic flows corresponding to client device 502 for transitioning to another network access device using similar operations.

Figure 6:
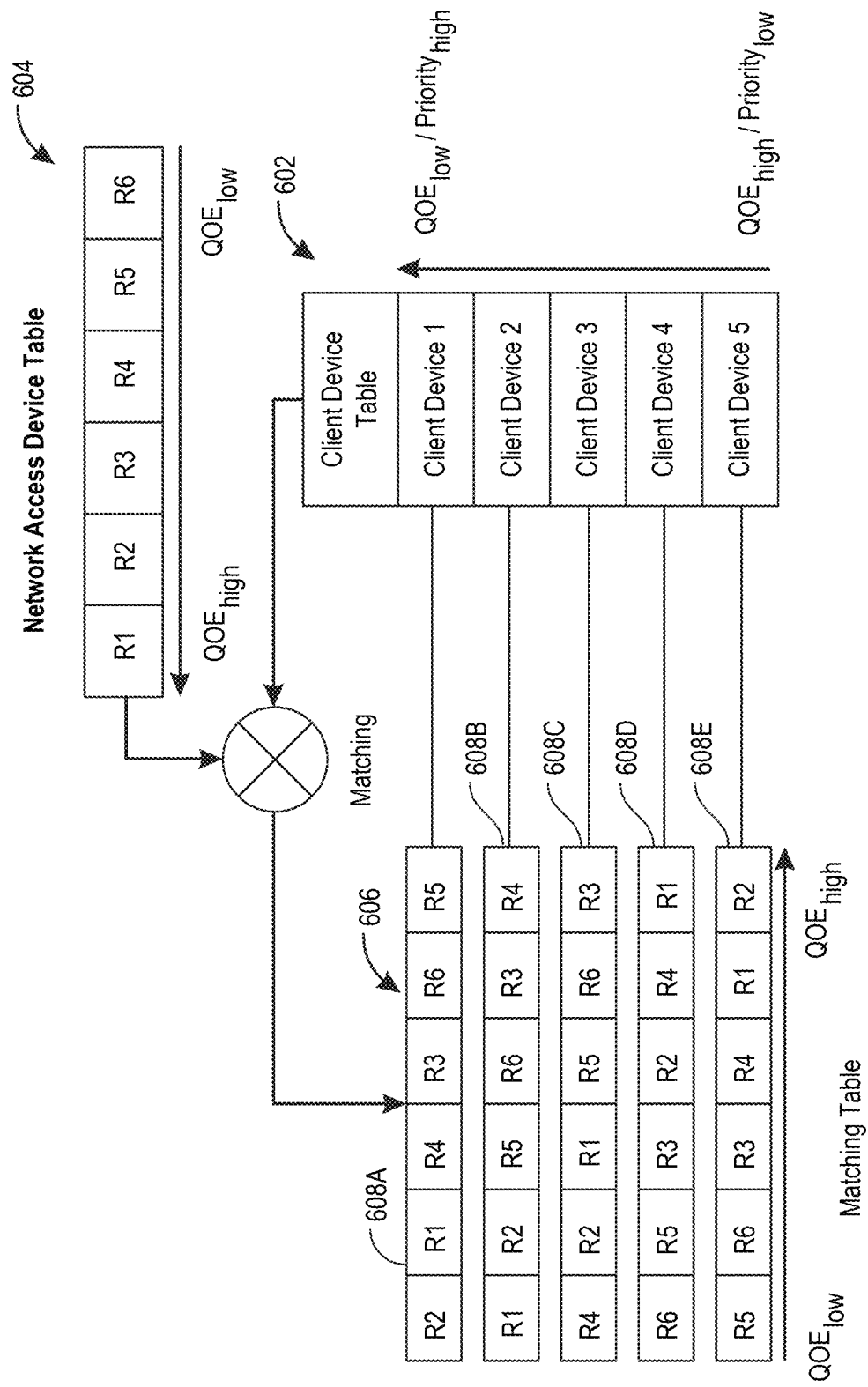
FIG. 6 is a schematic block diagram of an example QoE matching algorithm, in accordance with examples disclosed herein.

FIG. 6 is a schematic block diagram of an example QoE matching algorithm in accordance with examples disclosed herein. The QoE matching algorithm comprises a client device table 602 and a network access device table 604, both of which can be used to generate a table 606 of candidate network access devices for each client device listed in the client device table 602. The QoE matching algorithm computes a preference score for each network access device in the network access device table 604 with respect to each client device in the client device table 602 and sorts the network access device in order from highest preference score to lowest preference score for each client device in the table 606. The higher the preference score for a given network access device with respect to the a given client device, the more suitable the network access device is for handling traffic flows of the client device. Said another way, a higher preference score corresponds to a higher QoE provided by the network access device for that client device.

In the example of FIG. 6, the client device table 602 comprises a plurality of client devices, illustratively shown as client device 1 through client device 5. Each client device may be implemented as one of client device 110 a-j, 140a-d, 150a-b, 402 and/or 502. The client devices may be listed or ranked in an order from lowest client QoE score to highest client QoE score, where a client QoE score is computed as described above. A lower client QoE score may indicate a higher priority or need for addressing QoE because the end-user of the particular client device may be experiencing lower QoE.

In the example of FIG. 6, the network access device table 604 comprises a plurality of network access devices communicatively available the client devices listed in the client device table 602. The network access devices are illustratively provided as R1 through R6, each of which may be implemented as network access device 200 of FIG. 2. The network access devices may be provided in an ordered list from highest network access device QoE score to lowest network access devices QoE score. A network access devices QoE score can be computed based on all traffic flows flowing though the network access device. That is, the network access devices QoE score may be computed in a manner similar to the client QoE score, expect from the viewpoint of the network access devices. A higher network access devices QoE score indicates the network access devices is able to offer higher QoE to associated client devices.

In examples disclosed herein, for each client device, the QoE matching algorithm computes a preference score, which may also be referred to as a QoE match score, for a network access device currently associated with the client device and any neighboring network access devices (e.g., the network access devices contained in network access device table 604). The preference score for a given network access device can be a function of an availability score for that network access device, as described above in connection with FIG. 5; a capability match between the network access device and the client device (e.g., match between IEEE 802.11 standard compatibility); and an RSSI with which the network access device reads signals from the client device. In examples, the higher the availability score, the higher the preference score. Additionally, a match in capability may translate to a higher preference score. A larger absolute RSSI value can also mean a higher preference score. In various examples, RSSI values can be negative, thus examples herein may convert RSSI to a positive value by applying the following transformation: RSSI impact on preference score=105−(−1) RSSI. The preference scores can be normalized to a positive value between 0 and 100.

Using the preference scores, the matching algorithm generates ordered lists 608A-608E of network access devices sorted from highest preference score (e.g., highest QoE matching score) to lowest preference score (e.g., lowest QoE matching score) for each client device 1 through 5 in client device table 602. The ordered lists 608A-608E for each client device 1 through 5 can be combined to from table 606. In the example of FIG. 6, the ordered list 608A can be determined for client device 1 and comprises network access device R5, network access device R6, network access device R3, network access device R4, network access device R1, and network access device R2, in that order. Similarly, ordered lists 608B-608E can be generated for client devices 2 through 5, respectively, each comprising a different order of network access device.

Respective ordered lists of table 606 can be supplied to network access devices associated with each client device as a candidate list of network access device for transitioning client devices for improving QoE. For example, if client device 1 is currently associated with network access device R3, the matching algorithm may provide ordered list 608A to network access device R3. Network access device R3 may then determine whether or not to request client device 1 to transition to a higher ranked network access device (e.g., network access device R5 or R4). In examples, such requests can be performed using BTM messages, as described above. Thus, client device 1 can transition to network access device R5 for improved QoE. As another example, if client device 1 is current associated with network access device R5, the ordered list 608A may indicate that a more suitable network access device is not available and client device 1 may remain associated with the network access device R5. Similar operations can be performed for each client device using a respective ordered list.

Figure 7:
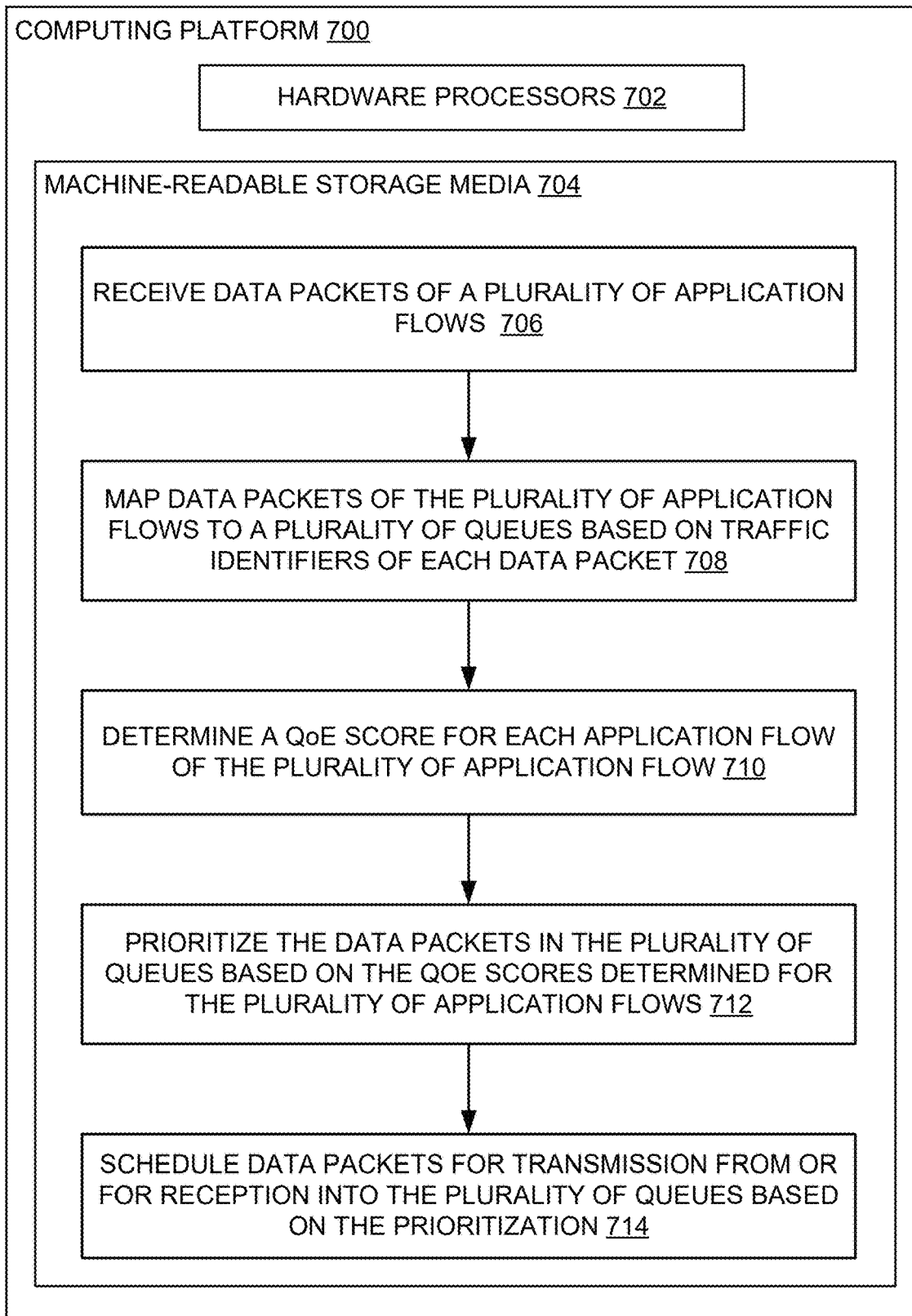
FIG. 7 is an example computing component that may be used to implement various features of traffic flow schedule optimization in accordance with the implementations disclosed herein.

FIG. 7 illustrates an example computing component that may be used to implement of traffic flow schedule optimization in accordance with various embodiments. Referring now to FIG. 7, computing component 700 may be, for example, a server computer, a controller, or any other similar computing component capable of processing data. In the example implementation of FIG. 7, the computing component 700 includes a hardware processor 702, and machine-readable storage medium for 704. The computing component 700 in some examples may be included in a network access device, such as one of network access devices 202, 504A-504D, and/or networks access devices of FIG. 6.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-714, to control processes or operations for traffic flow schedule optimization. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-714

Hardware processor 702 may execute instruction 706 to receive data packets of a plurality of traffic flows corresponding to a client device.

Hardware processor 702 may execute instruction 708 to map the data packets of the plurality of traffic flows to a queue based on a priority of each data packet. For example, as described above in connection with FIG. 2, the traffic identifiers can be assigned to the plurality of traffic flows based on the prioritization information. As described above the prioritization information can comprise an indicator designating one or more traffic flows as an LSA traffic flow or a high throughput traffic flow, and the one or more traffic flows can be mapped to one of a LSA queue and a high throughput queue. In examples, the prioritization information may include an indication that at least one of the plurality of traffic flows is a critical traffic flow and requirements on QoS parameters for satisfying QoE guarantees, such as one or more of a service interval, bit rate, burst size, maximum acceptable latency, maximum acceptable jitter, and maximum packet loss for the at least one critical traffic flow.

Hardware processor 702 may execute instruction 710 to determine a QoE score for each traffic flow of the plurality of traffic flows. For example, as described above in connection with FIG. 2, QoE scores can be computed based on at least one of: a jitter parameter of the traffic flow, a latency parameter of the traffic flow, a packet loss parameter of the traffic flow, a throughput parameter of the traffic flow, and an airtime parameter of the traffic flow. The QoE scores can be computed according to Eqs. 1-9 above.

Hardware processor 702 may execute instruction 712 to prioritize the data packets based on the QoE scores and the priority for each traffic flow. For example, as described above in more detail in connection with FIGS. 2 and 3, prioritization information may be obtained for a client device corresponding to the plurality of traffic flows and weights can be applied to the QoE scores based on the prioritization information. The data packets can be prioritized based the weighted QoE scores.

Hardware processor 702 may execute instruction 714 to schedule the data packets for transmission from or for reception into the queue based on the prioritization. For example, instruction 714 may include transmitting data packets from the queue based on the prioritization, or receiving the data packets from a client device into the queue according to the prioritization.

In examples, the hardware processor 702 may execute further instructions to determine whether a QoE score of a traffic flow of the plurality of traffic flows is below a QoE threshold defined by the QoE requirements. Based on the determination that the QoE score of the traffic flow is below the QoE threshold, the traffic flow can be steered to a different access point, as described above in connection with FIGS. 2-6.

Figure 8:
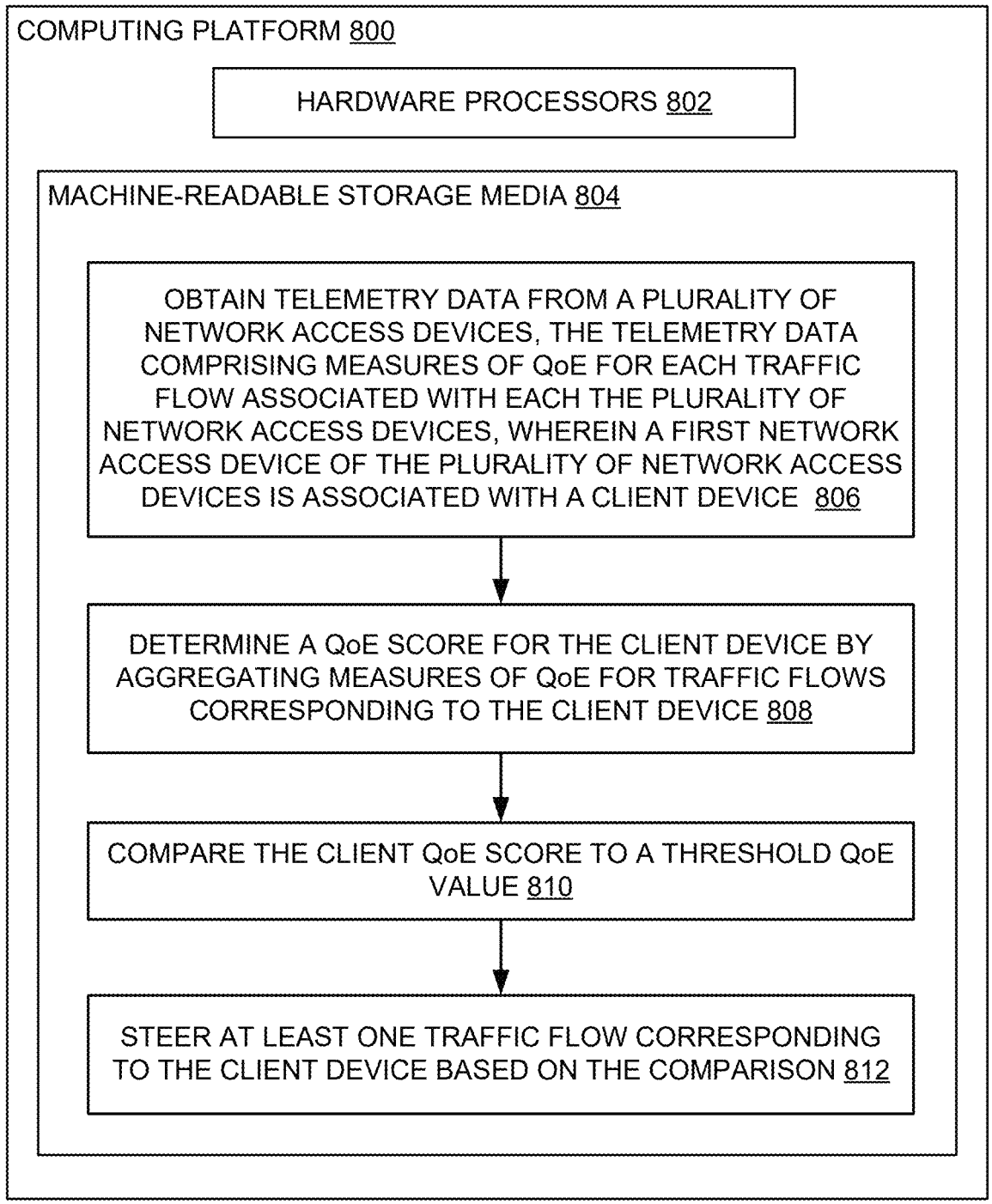
FIG. 8 is an example computing component that may be used to implement various features of QoE based transition optimization in accordance with the implementations disclosed herein.

FIG. 8 illustrates an example computing component that may be used to implement QoE based transition optimization in accordance with various embodiments. Referring now to FIG. 8, computing component 800 may be, for example, a server computer, a controller, or any other similar computing component capable of processing data. In the example implementation of FIG. 8, the computing component 800 includes a hardware processor 802, and machine-readable storage medium for 804. In an example, computing component 800 may be included in a server, such as one of servers 160a-b and/or 506, as well as flow optimization service servers as described herein.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-812, to control processes or operations for QoE based transition optimization. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-812.

Hardware processor 802 may execute instruction 806 to obtain telemetry data from a plurality of network access devices, the telemetry data comprising measures of QoE for each traffic flow associated with each the plurality of network access devices. A first network access device of the plurality of network access devices can be associated with a client device. In examples, a measure of QoE may be provided as a QoE score as described herein.

Hardware processor 802 may execute instruction 808 to determine a QoE score for the client device by aggregating measures of QoE for traffic flows corresponding to the client device. In examples, the QoE score in this case may be a client QoE score as described above in connection with FIGS. 5 and 6. In some examples, the QoE score may comprise applying weights to the measures of QoE for traffic flows corresponding to the client device based on prioritization information, as described above, for each traffic flow and aggregating the weighted measures of QoE. The weighting, in some examples, can be applied as described above in connection with FIGS. 5 and 6.

Hardware processor 802 may execute instruction 810 to compare the QoE score to a threshold QoE value. In examples, comparing the QoE score to the threshold QoE value may comprise determining that the QoE score is less than or equal to the threshold QoE value.

Hardware processor 802 may execute instruction 812 to steer at least one traffic flow corresponding to the client device based on the comparison. In examples, instructions 812 may include triggering the first network access device to send a request to transition the client device to a second network access device of the plurality of network access devices in response to the determination that the QoE score is less than or equal to the threshold QoE value. Further examples of the triggering and request are provided above in connection with FIGS. 2-6.

Figure 9:
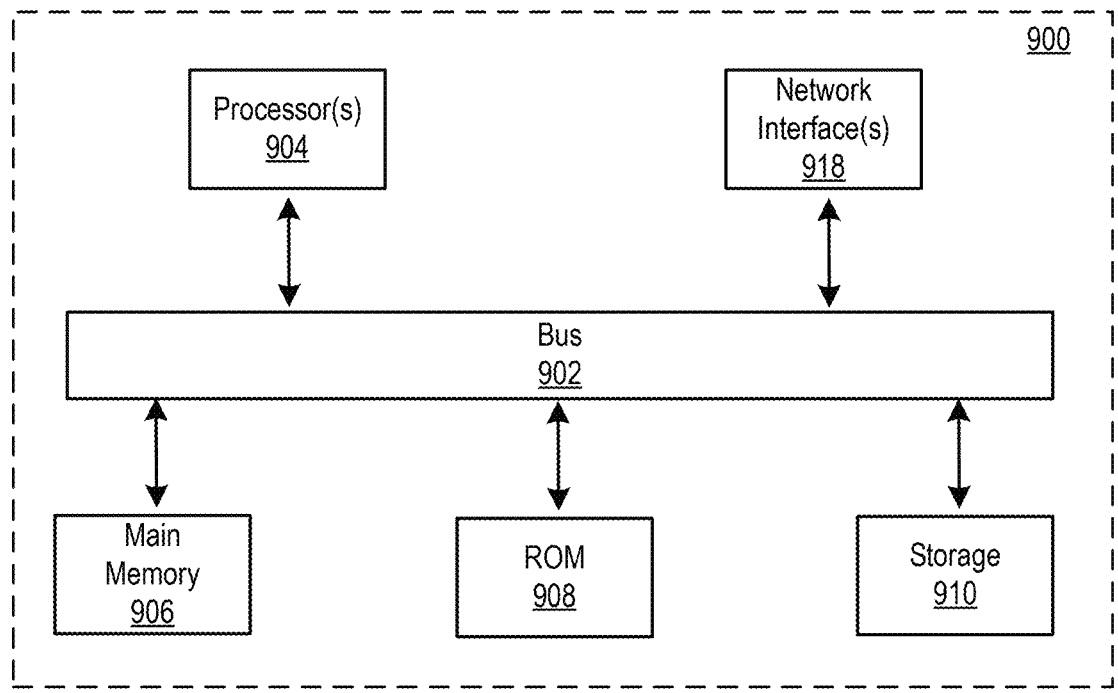
FIG. 9 is an example computer system that may be used to implement various features of QoE based flow optimization of the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors. The computer system 900 may be implemented as one or more of the components described in connection with FIG. 1 (e.g., client devices 110a-j, 140a-d, and 150a-b; APs 106a-c, 136, and 146; switches 108 and 138; controller 104; gateway devices 134 and 144; and servers 160a-b); network access device 200 of FIG. 2; server 460, gateway 404, client device 402 of FIG. 4; APs 504A-504D, client device 502, server 506 of FIG. 5; and/or network access devices and client devices of FIG. 6.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. Examples herein may store instructions in main memory 906 that, when executed by processor 904, perform the functions and operations described in connection with FIGS. 2-6.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a network interface 918 (also sometimes referred to as a communication interface) coupled to bus 902. Network interface 918 provides a two-way data communication coupling to one or more network links that are connected to one or more local networks. For example, network interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information. The network interface 918 may comprise or be considered a radio component of the computer system 900 for interfacing with remote devices.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 918, which carry the digital data to and from computer system 900, are example forms of transmission media.

The computer system 900 can send messages and receive data, including program code, through the network(s), network link and network interface 918. In the Internet example, a server might transmit a requested code for an application program through the Internet, the ISP, the local network and the network interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving data packets of a plurality of traffic flows by an access point of a network;
   mapping, by the access point, the data packets of the plurality of traffic flows to a plurality of queues based on traffic identifiers of each data packet;
   determining, by the access point, a Quality of Experience (QoE) score for each traffic flow of the plurality of traffic flows;
   obtaining prioritization information for a client device corresponding to the plurality of traffic flows;
   applying weights to QoE scores determined for the plurality of traffic flows based on the prioritization information to generate weighted QoE scores;
   prioritizing, by the access point, the data packets based on the weighted QoE scores determined for the plurality of traffic flows; and
   scheduling, by the access point, the data packets for transmission or reception based on the prioritization.

2. The method of claim 1, wherein prioritizing data packets in the plurality of queues based on the QoE scores comprises:
   prioritizing data packets of traffic flows having lower QoE scores over data packets of traffic flows having higher QoE scores.

3. The method of claim 1, wherein the traffic identifiers are assigned to the plurality of traffic flows based on the prioritization information, wherein the prioritization information comprises an indicator designating one or more traffic flows as a latency sensitive application traffic flow or a high throughput traffic flow.

4. The method of claim 1, wherein the prioritization information comprises an indication that at least one of the plurality of traffic flows is a critical traffic flow and requirements on Quality of Service (QOS) parameters for satisfying QoE guarantees, wherein the QoS parameters comprise one or more of a service interval, bit rate, burst size, maximum acceptable latency, maximum acceptable jitter, and maximum packet loss for the at least one critical traffic flow.

5. The method of claim 1, wherein the prioritization information is obtained from one or more of: a service level agreement for the client device, heuristic based learning by monitoring the plurality of traffic flows, and a flow priority request message from the client device provided according to one or more of Mirrored Stream Classification Service (MSCS), Stream Classification Service (SCS), and QoS specifications framework.

6. The method of claim 1, wherein determining the QoE score for each traffic flow comprises:
computing the QOE score based on at least one of: a jitter parameter of the traffic flow, a latency parameter of the traffic flow, a packet loss parameter of the traffic flow, a throughput parameter of the traffic flow, and an airtime parameter of the traffic flow.

7. The method of claim 1, further comprising:
determining whether a QoE score of a traffic flow of the plurality of traffic flows is below a QoE threshold; and
based on determining that the QoE score of the traffic flow is below the QoE threshold, steering the traffic flow to a different access point.

8. The method of claim 1, wherein the network is a wireless local area network (WLAN).

9. The method of claim 1, wherein the plurality of traffic flows comprises one or more of an uplink traffic flow and a downlink traffic flow.

10. A network access device comprising:
a memory storing instructions; and
a processor communicatively coupled to the memory and configured to execute the instructions to:
receive data packets of a plurality of traffic flows corresponding to a client device;
map the data packets of the plurality of traffic flows to a queue based on a priority of each data packet;
determine a Quality of Experience (QoE) score for each traffic flow of the plurality of traffic flows;
prioritize the data packets based on the QoE scores and the priority for each traffic flow;
schedule the data packets for transmission or reception based on the prioritization;
determine whether a QoE score of a traffic flow of the plurality of traffic flows is below a QoE threshold; and
based on determining that the QoE score of the traffic flow is below the QoE threshold, steering the traffic flow to a different access point.

11. The network access device of claim 10, wherein prioritizing data packets in the queue based on the QoE scores comprises:
prioritizing data packets of traffic flows having lower QoE scores over data packets of traffic flows having higher QoE scores.

12. The network access device of claim 10, wherein the processor is further configured to execute the instructions to:
obtain prioritization information for a client device corresponding to the plurality of traffic flows; and
apply weights to the QoE scores determined for the plurality of traffic flows based on the prioritization information,
wherein the prioritizing of the data packets in the queue is based the weighted QoE scores.

13. The network access device of claim 10, wherein determining the QoE score for each traffic flow comprises:
computing the QOE score based on at least one of: a jitter parameter of the traffic flow, a latency parameter of the traffic flow, a packet loss parameter of the traffic flow, a throughput parameter of the traffic flow, and an airtime parameter of the traffic flow.

14. A server comprising:
a memory storing instructions; and
a processor communicatively coupled to the memory and configured to execute the instructions to:
obtain telemetry data from a plurality of network access devices, the telemetry data comprising measures of Quality of Experience (QoE) for each traffic flow associated with each of the plurality of network access devices, wherein a client device is associated with a first network access device of the plurality of network access devices;
determine a QoE score for the client device by aggregating measures of QoE for traffic flows corresponding to the client device;
compare the QoE score to a threshold QoE value; and
steer at least one traffic flow corresponding to the client device based on the comparison, wherein steering the at least one traffic flow corresponding to the client device comprises: triggering the first network access device to send a request to transition the client device to a second network access device of the plurality of network access devices in response to a determination that the QoE score is less than or equal to the threshold QoE value.

15. The server of claim 14, wherein the measure of QoE for each traffic flow is based on at least one of: a jitter parameter for each traffic flow, a latency parameter for the traffic flow, a packet loss parameter for the traffic flow, a throughput parameter for the traffic flow, and an airtime parameter for the traffic flow.

16. The server of claim 14, wherein determining the QoE score for the client device comprises:
weighting the measures of QoE for traffic flows corresponding to the client device based on prioritization information for each traffic flow, wherein the prioritization information comprises one or more of a priority for the traffic flow, a service interval for the traffic flow, a bit rate for the traffic flow, a burst size of the traffic flow, maximum acceptable latency, maximum acceptable jitter, and maximum packet loss for the at least one critical traffic flow.

17. The server of claim 14, wherein triggering the first network access device comprises sending a transition request message to the first network access device, the transition request message comprising one or more candidate network access devices for association with the client device determined according to a QoE based matching algorithm.

* * * * *